(12) United States Patent
Yadappanavar et al.

(10) Patent No.: US 9,052,937 B2
(45) Date of Patent: Jun. 9, 2015

(54) MANAGING STORAGE COMMANDS ACCORDING TO INPUT-OUTPUT PRIORITIES AND DEPENDENCIES

(71) Applicant: VMware, Inc., Palo Alto, CA (US)

(72) Inventors: Krishna Yadappanavar, Sunnyvale, CA (US); Murali Vilayannur, San Jose, CA (US); Faraz Shaikh, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 351 days.

(21) Appl. No.: 13/779,051

(22) Filed: Feb. 27, 2013

(65) Prior Publication Data

US 2014/0245299 A1 Aug. 28, 2014

(51) Int. Cl.
*G06F 9/46* (2006.01)
*G06F 9/455* (2006.01)
*G06F 9/50* (2006.01)

(52) U.S. Cl.
CPC .............. *G06F 9/45533* (2013.01); *G06F 9/50* (2013.01); *G06F 9/45558* (2013.01); *G06F 2009/45579* (2013.01)

(58) Field of Classification Search
CPC .......................... G06F 9/45533; G06F 9/4881
USPC .............................................. 718/1, 102, 103
See application file for complete search history.

(56) References Cited

U.S. PATENT DOCUMENTS

| 7,496,918 | B1 * | 2/2009 | Dice et al. ...................... 718/100 |
| 7,984,444 | B1 * | 7/2011 | Shavit et al. ................... 718/102 |
| 8,079,019 | B2 * | 12/2011 | Lindo et al. .................... 717/129 |
| 8,601,486 | B2 * | 12/2013 | Achterberg et al. ........... 718/107 |
| 2010/0242043 | A1 * | 9/2010 | Shorb ............................ 718/104 |
| 2013/0024864 | A1 * | 1/2013 | Lakshmi ........................ 718/102 |
| 2013/0174165 | A1 * | 7/2013 | Chopra .......................... 718/102 |

* cited by examiner

*Primary Examiner* — Andy Ho

(57) ABSTRACT

Input/output operations (IOs) are issued to a storage system using request queues that are each maintained for a resource targeted by the IOs. When an IO is requested, the target resource for the IO is first identified. If a request queue is maintained for the target resource, the IO is added to the request queue and the IO is issued to the storage system as the target resource becomes available. The availability of the target resource may be determined through periodic checks or by monitoring completions of IOs issued out of the request queue.

20 Claims, 4 Drawing Sheets

MANAGING STORAGE COMMANDS ACCORDING TO INPUT-OUTPUT PRIORITIES AND DEPENDENCIES

BACKGROUND

Computer virtualization is a technique that involves encapsulating a physical computing machine platform into a virtual machine that is executed under the control of virtualization software on a hardware computing platform, or "host." A virtual machine (VM) has both virtual system hardware and guest operating system software. Virtual system hardware typically includes at least one "virtual disk," a single file or a set of files that appear as a typical storage drive to the guest operating system. The virtual disk may be stored on the host platform or on a remote storage device. Typically, a virtual machine uses the virtual disk in the same manner that a physical storage drive is used, to store the guest operating system, application programs, and application data.

A virtual disk is typically organized as a set of logical data blocks that are accessed by a VM via a file descriptor associated with a virtual disk. Multiple VMs may share a data block of the virtual disk, such that multiple file descriptors reference the data block. Certain IOs issued to the shared data block may require completion and block any other IOs to be issued thereto. As a result, if multiple VMs share many data blocks of a virtual disk, write operations can become very slow resulting in the degradation of the overall performance of the virtualized environment.

SUMMARY

One or more embodiments of the invention provide techniques for managing input/output operations (IOs) in a virtualized computer system in a manner that speeds up processing of IOs issued by virtual machines running in the virtualized computer system. According to the one or more embodiments, request queues are each maintained for a resource targeted by blocking IOs. When a VM requests a blocking IO, a hypervisor thread managing that IO adds the IO to the appropriate request queue and does not issue the blocking IO to the storage system until the target resource becomes available. The hypervisor thread determines the availability of the target resource through periodic checks or by monitoring completions of IOs issued out of the request queue.

A method of issuing IOs to a storage system in a computer system having a plurality of concurrently running execution threads for managing the IOs, according to an embodiment, includes the steps of identifying a resource of the storage system targeted by first and second IOs, wherein the first IO is managed by a first execution thread and the second IO is managed by a second execution thread, and adding the first and second IOs to a request queue maintained for the resource. If the resource is available, one of the IOs is issued to the storage system. If the resource is not available, the availability of the resource is checked periodically and the IOs are issued as the resource becomes available.

Further embodiments of the present invention include a non-transitory computer-readable storage medium comprising instructions that cause a computer system to carry out the above method as well as a computer system configured to carry out the above method.

DETAILED DESCRIPTION

Figure 1:
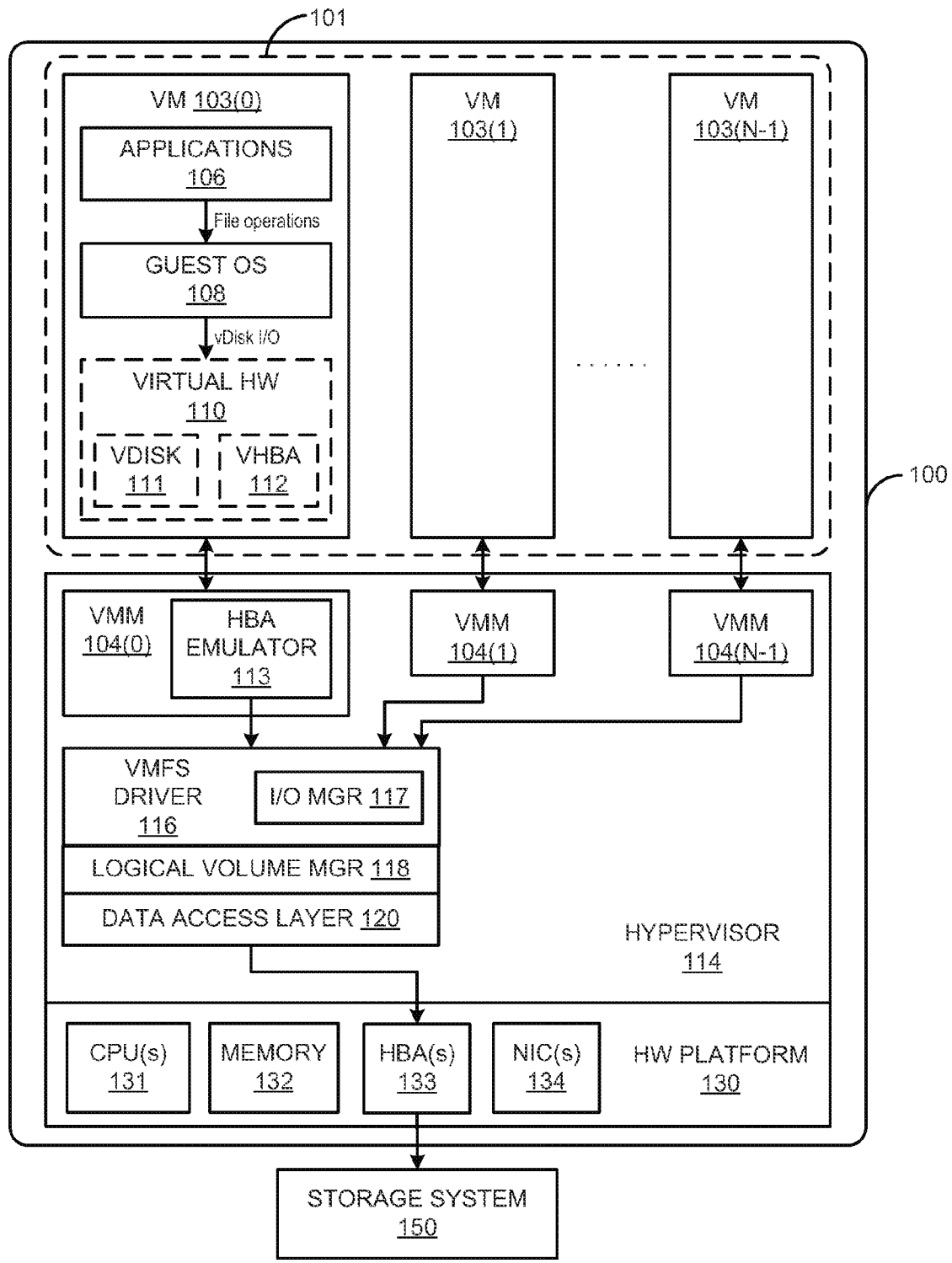
FIG. 1 is a block diagram of a virtual machine based computer system in which one or more embodiments may be practiced.

FIG. 1 is a block diagram of a virtual machine based computer system 100 in which one or more embodiments may be practiced. Computer system 100 includes a hardware platform 130, including, for example, central processing units (CPUs) 131, system memory 132, host bus adapters (HBAs) 133 that connect computer system 100 to remote data storage systems, and network interface controllers (NICs) 134 that connect computer system 100 to a computer network, e.g., the Internet. A virtualization software, commonly known as a hypervisor 114, is implemented on top of hardware platform 130, to support a virtual machine execution space 101 within which N virtual machines (VMs) 103 can be instantiated and executed. In one embodiment, hypervisor 114 corresponds to the vSphere product (and related utilities) developed and distributed by VMware, Inc., Palo Alto, Calif. although it should be recognized that vSphere is not required in the practice of the teachings herein.

Hypervisor 114 provides the services and support that enable concurrent execution of VMs 103. Each VM 103 supports the execution of a guest operating system 108, which, in turn, supports the execution of applications 106. Examples of guest operating system 108 include Microsoft® Windows®, the Linux® operating system, and NetWare®-based operating systems, although it should be recognized that any other operating system may be used in embodiments. Guest operating system 108 includes a native or guest file system, such as, for example, an NTFS or ext3FS type file system. The guest file system may utilize a host bus adapter driver (not shown) in guest operating system 108 to interact with a host bus adapter emulator 113 in a virtual machine monitor component (VMM) 104 of hypervisor 114. Conceptually, this interaction provides guest operating system 108 (and the guest file system) with the perception that it is interacting with actual hardware.

FIG. 1 also depicts a virtual hardware platform 110 as a conceptual layer in VM 203(0) that includes virtual devices, such as virtual HBA 112 and virtual disk 111, which itself may be accessed by guest operating system 108 through virtual HBA 112. In one embodiment, the perception of a virtual machine that includes such virtual devices is effectuated through the interaction of device driver components in guest operating system 108 with device emulation components (such as host bus adapter emulator 113) in VMM 104(0) (and other components in hypervisor 114).

File system calls initiated by guest operating system 108 to perform file system-related data transfer and control operations are processed and passed to VMM 104(0) and other components of hypervisor 114 that implement the virtual system support necessary to coordinate operation with hardware platform 130. For example, HBA emulator 113 functionally enables data transfer and control operations to be ultimately passed to HBAs 133. File system calls for performing data transfer and control operations generated, for example, by one of applications 106 are translated and passed to a virtual machine file system (VMFS) driver 116 that manages access to files (e.g., virtual disks, etc.) stored in data storage systems (such as storage system 150) that may be accessed by any of VMs 103. For example, guest operating system 108 receives file system calls and performs corresponding command and data transfer operations against virtual disks, such as virtual SCSI devices accessible through HBA emulator 113, that are visible to guest operating system 108. Each such virtual disk may be maintained as a file or set of files stored on VMFS, for example, in a data store exposed by storage system 150. The file or set of files may be generally referred to herein as a virtual disk and, in one embodiment, complies with virtual machine disk format specifications promulgated by VMware (e.g., sometimes referred to as a vmdk files). File system calls received by guest operating system 108 are translated to instructions applicable to particular file in a virtual disk visible to guest operating system 108 (e.g., data block-level instructions for 4 KB data blocks of the virtual disk, etc.) to instructions applicable to a corresponding vmdk file in VMFS (e.g., virtual machine file system data block-level instructions for 1 MB data blocks of the virtual disk) and ultimately to instructions applicable to a data store exposed by storage system 150 that stores the VMFS (e.g., SCSI data sector-level commands). Such translations are performed through a number of component layers of an "IO stack," beginning at guest operating system 108 (which receives the file system calls from applications 106), through host bus emulator 113, VMFS driver 116, a logical volume manager 118 which assists VMFS driver 116 with mapping files stored in VMFS with the data stores exposed by storage system 150, a data access layer 120, including device drivers, and HBAs 133 (which, e.g., issues SCSI commands to storage system 150).

According to one or more embodiments, an IO manager 117 running inside VMFS driver 116 implements the functionalities described herein. IO manager 117 is responsible for setting up request queues for each resource of storage system 150 that are being targeted by IOs issued by VMs 103 in a "blocking context." A "blocking context" as used herein refers to IOs performed on a storage resource, such as a data block or data blocks, that would block other IOs from being issued thereto. One example of a "blocking context" is a write.

Figure 2:
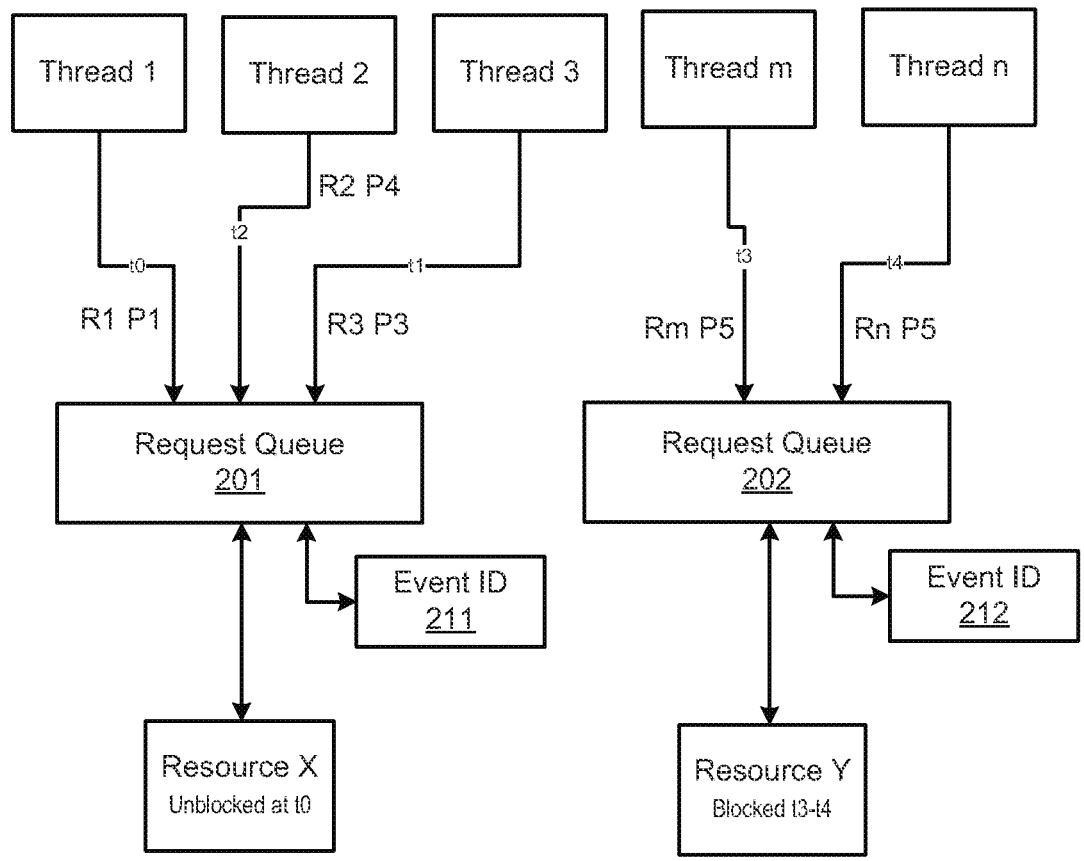
FIG. 2 is a conceptual diagram that illustrates an IO management method that employs request queues according to an embodiment.

FIG. 2 is a conceptual diagram that illustrates an IO management method that employs request queues. For simplicity, only five concurrently executing threads are shown in FIG. 2. In practice, the number of concurrently executing threads may equal the number of virtual CPUs. In the example of FIG. 2, the threads request IOs R1, R3, R2, Rm, and Rn in the following time order: t0, t1, t2, t3, and t4, respectively. Each request has an associated priority assigned thereto by the thread according to the relative importance of the IO. Five levels of priority, P1 through P5, are assigned in the example shown, with P1 being the lowest priority, then P2, P3, and P4, and P5 being the highest priority. For example, a metadata IO may be given a high priority, such as P5. On the other hand, a data IO may be given a tow priority, such as P1. When multiple IOs are placed in the same request queue, IO manager 117 examines the priorities assigned to the IOs and issues the IOs according to the priorities, with the higher priority IOs being processed before lower priority IOs.

In one embodiment, when an IO is issued from a request queue, an event identifier associated with the IO is stored. In FIG. 2, the storage area for request queue 201 is indicated as event ID 211 and the storage area for request queue 202 is indicated as event ID 212. Upon completion of the IO, the event identifier of the IO is updated. As a result, an IO request that is queued in request queue 201 can detect a completion of an in-flight IO that caused it to be queued, and an IO request that is queued in request queue 202 can detect a completion of an in-flight IO that caused it to be queued.

In the example shown in FIG. 2, it is assumed that resource X is targeted in IOs requested by threads 1, 2, 3 and resource Y is targeted in IOs requested by threads m, n. Also, resource X is assumed to be unblocked at time t0 and resource Y is assumed to be blocked from time t3 through time t4. Thus, when thread 1 requests IO R1 at time t0, the IO is issued right away because resource X is available. In addition, event ID 211 is updated with an event identifier for IO R1. When the IO completes, event ID 211 is updated with a different value. For purposes of illustrating this embodiment, however, it is assumed that IO R1 does not complete by the time IO R3 is requested at time t1 and IO R2 is requested at time t2.

Continuing with the example, when thread 3 requests IO R3 at time t1, the request is added to request queue 201 because resource X is not available. Also, when thread 2 requests IO R2 at time t2, the request is added to request queue 201 because resource X is not available. When the IO associated with IO R1 eventually completes, thread 1 updates the event identifier stored in event ID 211. When threads 2 and 3 detect this update, thread 2 issues IO associated with its request (IO R2) out of request queue 201 (assuming no other IOs of higher priority have been added to request queue 201) and thread 3 is forced to wait again because IO R2 has a higher priority than IO R3 (P4>P3). When thread 2 issues IO R2, it inserts a new event identifier in event ID 211. Upon completion of this IO, thread 2 updates the event identifier stored in event ID 211. When thread 3 detects this update, thread 3 issues IO R3 out of request queue 201 (assuming no other IOs of higher priority have been added to request queue 201). When thread 3 issues IO R3, it inserts a new event identifier in event ID 211. Upon completion of this IO, thread 3 updates the event identifier stored in event ID 211.

When thread m requests IO Rm at time t3 and thread n requests IO Rn at time t4, both requests are added to request queue 202 because resource Y is not available. When resource Y becomes available, thread m issues IO Rm out of request queue 202 before thread n issues IO Rn out of request queue 202. Although IO Rm and IO Rn have the same priorities, IO Rm is issued first because it was added to request queue 202 prior to IO Rn. When thread m issues IO Rm, it inserts a new event identifier in event ID 212. Upon completion of this IO, thread m updates the event identifier stored in event ID 212 which causes thread n to issue IO Rn out of request queue 202 (assuming no other IO requests of higher priority have been added to request queue 202).

Figure 3:
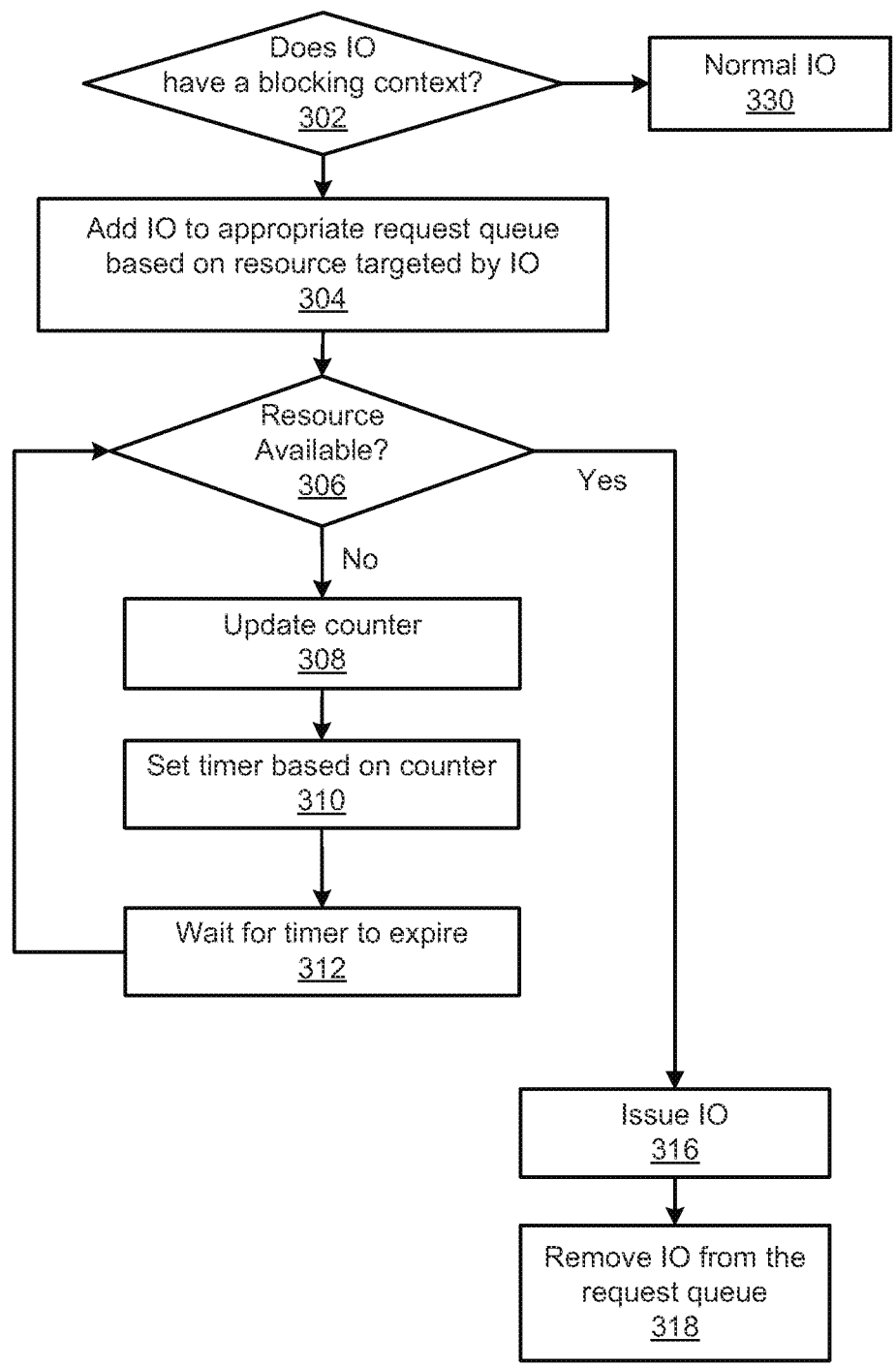
FIG. 3 is a flow diagram of method steps for issuing IOs according to an embodiment.

FIG. 3 is a flow diagram of method steps for issuing IOs according to an embodiment. In the embodiment described herein, the method steps of FIG. 3 are carried out by IO manager 117, in particular the individual threads that are managing IOs requested by VMs 103. In this embodiment, the threads place blocking IOs requested by VMs in appropriate queues if they cannot be executed because another IO is concurrently targeting the same storage resource. According to a predetermined schedule, the threads check the availability of the storage resource and issue the IOs as the storage resource becomes available. The predetermined schedule may define equally spaced time intervals between the checks or time intervals that are exponentially increasing between the checks.

The method shown in FIG. 3 begins at step 302, with a thread determining whether or not the requested IO has a blocking context. If it does not, the IO is issued in the normal manner (step 330). If the requested IO has a blocking context, the requested IO is added to a request queue for a storage resource targeted by the IO (step 304). Then, at step 306, the thread determines whether or not the storage resource is available. If the storage resource is not available, a loop counter is updated at step 308 and a timer is set based on the loop counter at step 310. In one embodiment, the timer is set as a product of the loop counter and a predetermined time interval. For example, the first time through the loop, the timer may be set at X msec and N-th time through the loop as N*X msec. In another embodiment, the timer is set as a product of a multiplier and a predetermined time interval, where the multiplier may be some number raised to the power of the loop counter minus 1. For example, the first time through the loop, the timer may be set at 2^0*X msec and N-th time through the loop as 2^(N−1)*X msec. At step 312, the thread waits for the timer to expire and returns to step 306 when the timer expires.

Returning to step 306, if the thread determines that the storage resource is available, the thread issues the IO at step 316. Then, at step 318, the IO issued at step 316 is removed from the request queue.

Figure 4:
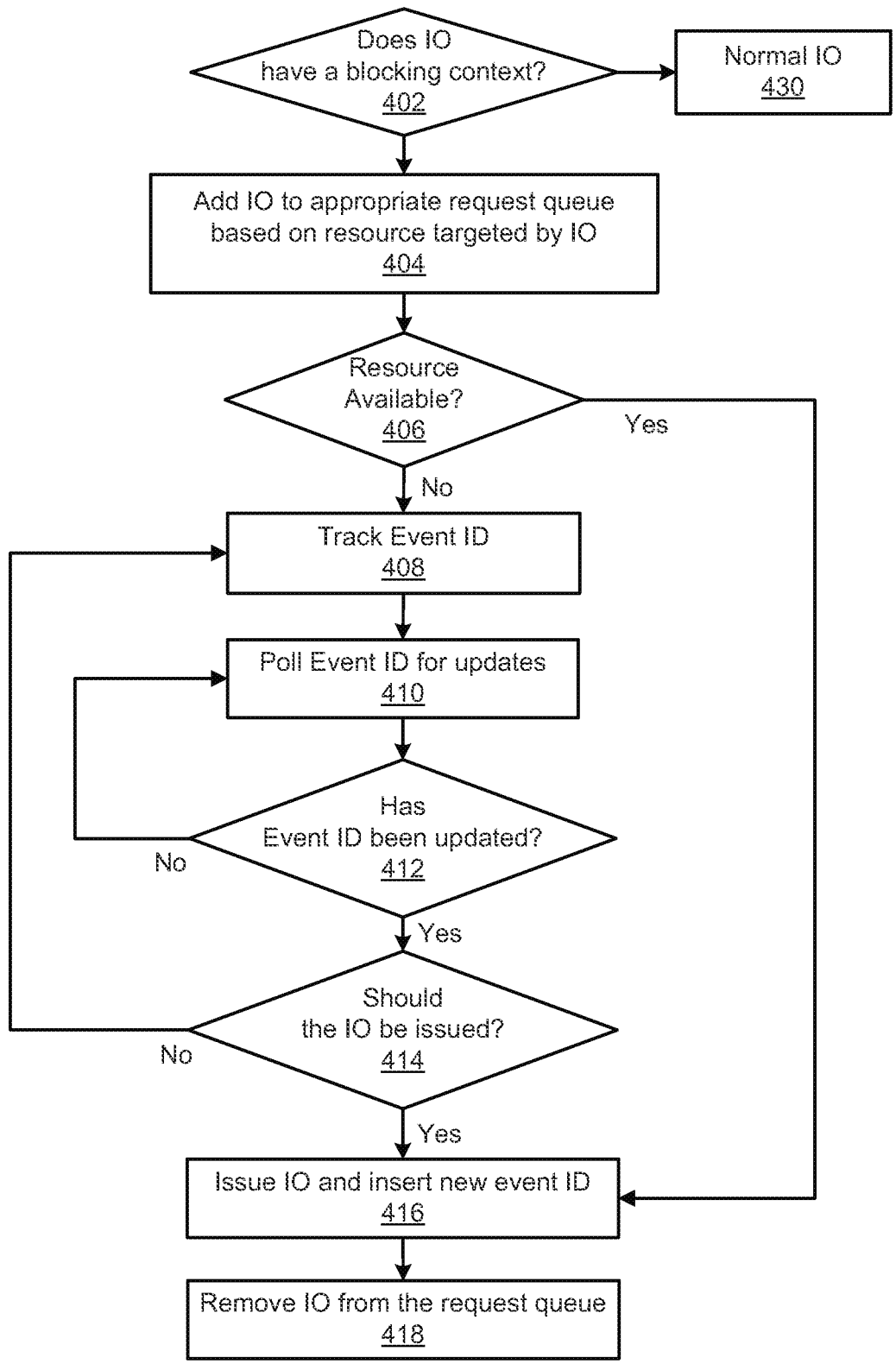
FIG. 4 is a flow diagram of method steps for issuing IOs according to another embodiment.

FIG. 4 is a flow diagram of method steps for issuing IOs according to another embodiment. In the embodiment described herein, the method steps of FIG. 4 are carried out by IO manager 117, in particular the individual threads that are managing IOs requested by VMs 103. In this embodiment, the threads place blocking IOs requested by VMs in queues if they cannot be executed because another IO is concurrently targeting the same storage resource. When this other IO that is concurrently targeting the same storage resource completes, the thread that issued this other IO updates an event identifier associated with the queue of the storage resource. Upon detecting that this event identifier has been updated, the IO request in the queue having the highest priority is executed next. The process repeats in this manner until all IO request in the queue are executed.

The method shown in FIG. 4 begins at step 402, with a thread determining whether or not the requested IO has a blocking context. If it does not, the IO is issued in the normal manner (step 430). If the requested IO has a blocking context, the requested IO is added to a request queue for a storage resource targeted by the IO (step 404). Then, at step 406, the thread determines whether or not the storage resource is available. If the storage resource is not available, at step 408, the thread tracks an event identifier that has been assigned to the request queue. At steps 410 and 412, the thread polls the event identifier for updates. If the event identifier has been updated (indicating that the pending IO has completed), the decision block at step 414 is executed. In this decision block at step 414, the thread determines whether its IO should be issued. In one embodiment, if the thread's IO has been placed in the request queue at the earliest time among the IOs having the highest IO priority, the thread issues the IO and inserts a new event identifier for this request queue (step 416). At step 418, the IO that was issued at step 416 is removed from the request queue.

Returning to step 414, if another thread's IO has a higher priority or has the same priority and was placed in the request queue earlier, this other thread's IO is issued, and the method returns to step 408 where the thread tracks for updates the event identifier for this request queue as inserted by this other thread.

The inventive features described herein may be applied in non-virtualized embodiments having applications running on top of an operating system and a filter driver implemented on top of a native file system driver of the operating system. The filter driver in such embodiments may be implemented in software or hardware and is configured to expose and manage thinly-provisioned files in a similar manner as the virtual disk in the virtualized embodiments.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments, may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention (s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method of issuing input/output operations (IOs) to a storage system in a computer system having a plurality of concurrently running execution threads, the method comprising:
   identifying a resource of the storage system targeted by first and second IOs, wherein the first IO is requested by a first execution thread and the second IO is requested by a second execution thread;
   adding the first and second IOs to a request queue maintained for the resource; and
   if the resource is determined to be available, issuing one of the IOs to the storage system and, if the resource is determined to be unavailable, checking the availability of the resource after some time has elapsed.

2. The method of claim 1, wherein the availability of the resource is checked repeatedly according to a predetermined schedule.

3. The method of claim 2, wherein the predetermined schedule defines equally spaced time intervals between checks.

4. The method of claim 2, wherein the predetermined schedule defines time intervals that are exponentially increasing between checks.

5. The method of claim 1, further comprising:
   tracking a completion of the IOs that target the resource; and
   determining that the resource has become available when an IO that targets the resource has completed.

6. The method of claim 5, wherein one of the first and second IOs is issued to the storage system according to IO priorities assigned thereto upon determining that the resource has become available.

7. The method of claim 1, wherein the first and second IOs are added to the request queue maintained for the resource according to IO priorities assigned to the first and second IOs.

8. The method of claim 1, wherein the computer system has a plurality of virtual machines running therein and the first and second IOs are derived from IOs issued by the virtual machines to virtual disks thereof.

9. A non-transitory computer readable medium comprising instructions that, when executed by a processor of a computer system having a plurality of concurrently running execution threads, cause the processor to carry out a method of issuing input/output operations (IOs) to a storage system, the method comprising:
   identifying a resource of the storage system targeted by first and second IOs, wherein the first IO is requested by a first execution thread and the second IO is requested by a second execution thread;
   adding the first and second IOs to a request queue maintained for the resource; and
   if the resource is determined to be available, issuing one of the IOs to the storage system and, if the resource is determined to be unavailable, checking the availability of the resource after some time has elapsed.

10. The non-transitory computer readable medium of claim 9, wherein the availability of the resource is checked repeatedly according to a predetermined schedule.

11. The non-transitory computer readable medium of claim 10, wherein the predetermined schedule defines equally spaced time intervals between checks.

12. The non-transitory computer readable medium of claim 10, wherein the predetermined schedule defines time intervals that are exponentially increasing between checks.

13. The non-transitory computer readable medium of claim 9, wherein the method further comprises:
   tracking a completion of the IOs that target the resource; and
   determining that the resource has become available when an IO that targets the resource has completed.

14. The non-transitory computer readable medium of claim 13, wherein one of the first and second IOs is issued to the storage system according to IO priorities assigned thereto upon determining that the resource has become available.

15. The non-transitory computer readable medium of claim 9, wherein the first and second IOs are added to the request queue maintained for the resource according to IO priorities assigned to the first and second IOs.

16. The non-transitory computer readable medium of claim 9, wherein the computer system has a plurality of virtual machines running therein and the first and second IOs are derived from IOs issued by the virtual machines to virtual disks thereof.

17. A computer system having virtual machines executed therein and a virtualization software for managing input/output operations (IOs) issued by the virtual machines to virtual disks thereof with a plurality of concurrently running execution threads, the virtualization software being programmed to:
   identify a storage resource targeted by first and second IOs, wherein the first IO is requested by a first execution thread and derived from an IO issued by one of the virtual machines, and the second IO is requested by a second execution thread and derived from an IO issued by one of the virtual machines;
   add the first and second IOs to a request queue maintained for the resource; and
   if the resource is determined to be available, issue one of the IOs to the storage system and, if the resource is determined to be unavailable, check the availability of the resource after some time has elapsed.

18. The computer system of claim 17, wherein the availability of the resource is checked repeatedly according to a predetermined schedule.

19. The computer system of claim 18, wherein the virtualization software is further programmed to:
   track a completion of the IOs that target the resource; and
   determine that the resource has become available when an IO that targets the resource has completed.

20. The computer system of claim 17, wherein the first and second IOs are added to the request queue maintained for the resource according to IO priorities assigned to the first and second IOs.

* * * * *